Nov. 26, 1940.  J. P. KRIECHBAUM  2,222,800
CONTROL SYSTEM
Filed June 30, 1933  3 Sheets-Sheet 1

Inventor
JOHN P. KRIECHBAUM
By George H. Fisher
Attorney

Patented Nov. 26, 1940

2,222,800

UNITED STATES PATENT OFFICE 2,222,800

CONTROL SYSTEM

John P. Kriechbaum, Minneapolis, Minn., assignor to Minneapolis-Honeywell Regulator Company, Minneapolis, Minn., a corporation of Delaware Application June 30, 1933, Serial No. 678,429

18 Claims. (Cl. 236—9)

The present invention relates to an improved control mechanism and an improved control system utilizing the improved control mechanism.

One of the objects of the invention is the provision of a control mechanism wherein a first member to be controlled is operated in accordance with changes in any desired condition or force, there being means for adjusting the operation of the controlled member by the condition or force, together with a second controlled member which is moved to a new position upon movement of the adjusting means to a predetermined position.

More specifically, an object of the invention is the provision of two switching means, one of which is positioned in accordance with the changes in a condition together with means for adjusting the value of the condition at which the first switching means will be operated to its new position and mechanism associated with the second switching means and the adjusting means whereby the second switching means will be moved to a new position upon operation of the adjusting means to a predetermined position.

In the specific embodiment of the invention to be hereinafter disclosed a thermostatic actuator controls a first switch in accordance with temperature changes, there being a means for adjusting the temperature at which the switch will be moved to open and closed position, and the adjusting means being so associated with a double circuit switch that the double circuit switch will be moved to a new position upon movement of the adjusting means to a predetermined or extreme position. Such a device has particular utility in the field of automatic controls where it is desired to change the operation of the system during the summer with the least number of manual operations.

A further object of the invention is the provision of a control device including an actuator one end of which is relatively stationary and the other end of which operates a controlled member, and means for adjusting the relatively stationary end of the actuator to vary the value of the condition at which the controlled member will be moved to a predetermined position together with indicating means controlled by the conjoint action of the actuator and the adjusting means whereby the value of the condition will be indicated irrespective of the position of adjusting means.

More specifically, an object of the invention is the provision of a thermostatic switch of that type in which one end of the thermostatic actuator moves the switch conformably to temperature changes and the other end is adjustable to vary the temperature at which the switch will be moved to open and closed position and further providing indicating means which is conjointly controlled by the thermostatic actuator and the adjusting means so that the indicating means always indicates the value of the temperature to which the thermostatic element responds irrespective of the adjustment of the thermostatic element.

A further object of the invention is the provision of an improved control system wherein a fluid circulating means is operated at various speeds in accordance with changes in two or more conditions. In the hereinafter described embodiment of this particular phase of the invention, a fluid circulating means under certain conditions is operated either not at all, at an intermediate speed, or at a high speed. Under other conditions, the fluid circulating means is always in operation but may be operated either at high or low speeds.

A further object of the invention is the provision of a humidifying system including means for circulating air and means for adding water to the circulating air, the system being so arranged that the speed of the flow of air is varied under varying conditions but water for humidifying purposes is only supplied to the air when it is being circulated at its highest speed.

Another object of the invention is the provision of a system for heating and circulating a fluid medium on a fall in space temperature at the command of a space thermostat in the winter and including switching means operated by the temperature of the fluid medium for preventing circulation of the fluid medium when its temperature is too low and for preventing heating of the fluid medium when its temperature is too high together with reversing switching mechanism which when operated reverses the action of the space thermostat so as to circulate the fluid medium upon a rise in space temperature during the summer and further providing adjusting means for the switching means arranged so that when the switching means is adjusted to prevent heating of the fluid medium but to always allow circulation thereof at the command of the space thermostat, the reversing switching mechanism is also operated to reverse the action of the space thermostat.

Other objects of the invention include the details of construction of the whole mechanism and the various combinations and sub-combinations found both in the control mechanism and in the control system.

Other objects of the invention will become apparent as the description of the invention proceeds.

For a more complete understanding of the invention, reference should be had to the following descriptions and accompanying drawings, in which.

Figure 1:
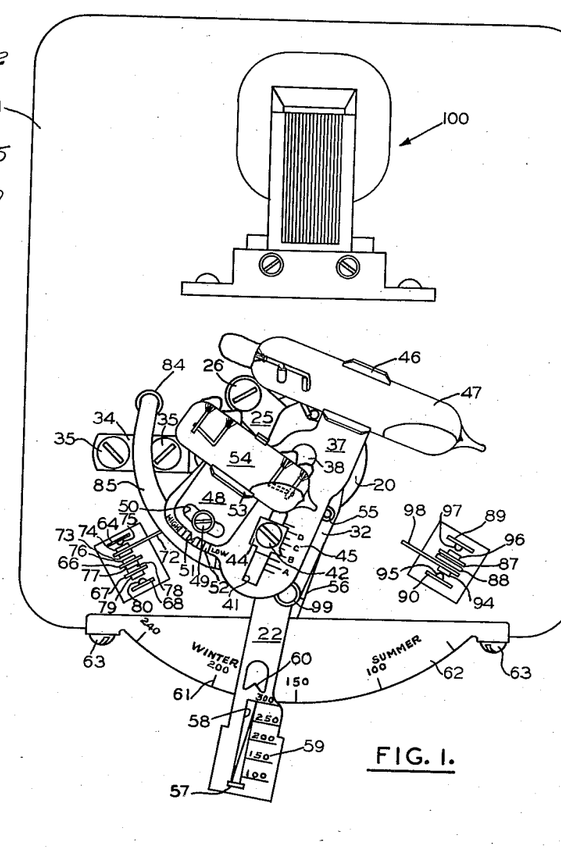
Fig. 1 is a front view of the switching mechanism of the present invention.
Figure 2:
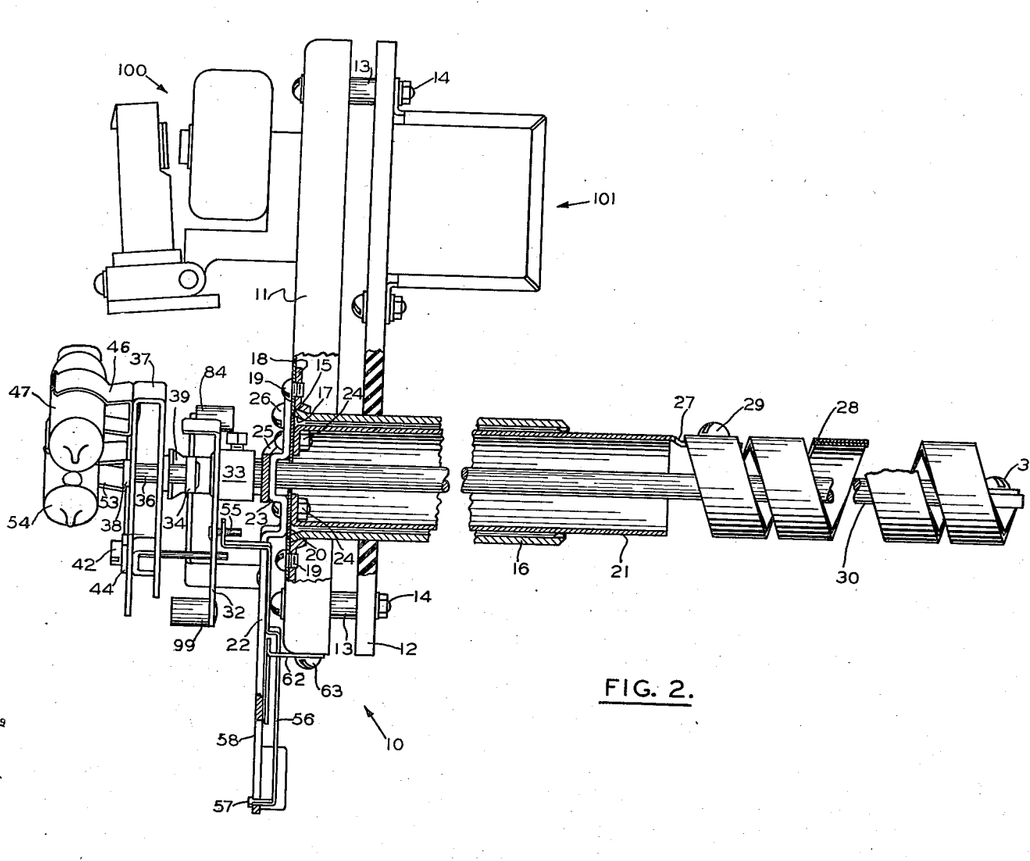
Fig. 2 is a side view of the switching mechanism of Fig. 1 with certain parts in section and other parts broken away in order to show the details of the device more clearly.
Figure 3:
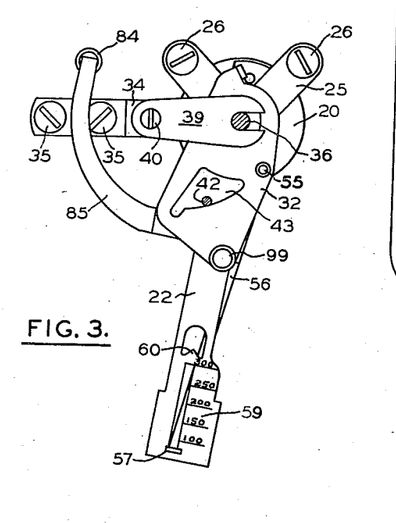
Fig. 3 is a front view of the switching mechanism of Fig. 1 with the front part thereof and surrounding parts removed.

Referring first to Figs. 1, 2 and 3, the switching mechanism of the instant invention, generally indicated at 9, includes a base generally indicated at 10 which base comprises a flanged base plate 11 and a panel 12 of heat-insulating material, the panel 12 being spaced from the base plate 11 by means of spacing sleeves 13 and these parts being held together by means of screw and nut assemblies indicated at 14. The base plate 11 is provided with a circular opening 15. A cylindrical mounting member 16 which is provided with an expanded end 17 abuts the periphery of opening 15 at the rear side thereof, and extends rearwardly through panel 12. A collar 18 surrounds the expanded end 17 of cylindrical mounting member 16 and is secured to base plate 11 by means of screws 19 whereby cylindrical mounting member 16 is rigidly secured to the base plate 11. A circular plate 20 is placed in the opening 15 formed in base plate 11 and abuts the end of expanded end 17 of cylindrical mounting member 16 which end also abuts the rear side of base plate 11. A tubular member 21 placed within and concentric to cylindrical mounting member 16 abuts the rear side of circular plate 20. An adjusting handle 22 is formed with an upraised portion 23 and abuts the front side of circular plate 20. Screws and nuts 24 secure tubular member 21, circular plate 20, and adjusting handle 22 together in a unitary structure. A bracket 25, which is secured to base plate 11 by means of screws 26, abuts the up-raised portion 23 of adjusting handle 22 and presses circular plate 20 against the expanded end 17 of cylindrical mounting member 16 whereby the circular plate 20 and associated parts may be rotated but are prevented from moving longitudinally. The bracket 25 additionally frictionally clamps adjusting handle 22 in any position to which it is manually moved. The outer free end of tubular member 21 is provided with an extension 27 to which one end of a bi-metallic helix 28 is secured as indicated at 29. The other end of bi-metallic helix 28 is secured to a torsion rod 30, as indicated at 31, the torsion rod extending frontwardly through the bi-metallic helix 28, the tubular member 21, the circular plate 20, the upraised portion 23 of adjusting handle 22, and bracket 25 and terminates a short distance in front of base plate 11. A cam plate 32 is secured to the end of torsion rod 30 by any suitable means such as the collar 33.

The apparatus thus far described operates to position the cam plate 32 in accordance with temperature changes to which the bi-metallic helix 28 is subjected and the temperature at which cam plate 32 will be moved to a predetermined position may be varied by operating adjusting handle 22 to rotate tubular member 21 and the relatively fixed end of bi-metallic helix 28.

A bracket 34 which is secured to base plate 11 by means of screws 35 carries a stud-shaft 36 which extends forwardly from the base plate 11 and is in alignment with torsion rod 30. A mercury switch carrier 37 is mounted upon stud-shaft 36 and is frictionally pressed against the enlarged head 38 thereof by means of a leaf-spring 39 which is carried by and secured to bracket 34 by means of a screw 40. The mercury switch carrier 37 is provided with a slot 41 which receives a screw 42 that extends into an irregular opening 43 which is formed in cam plate 32. The screw 42 serves to clamp a pointer 44 against carrier 37 which pointer cooperates with indicia 45 carried by carrier 37. By reason of the irregular shape of slot 43, movement of screw 42 in slot 41 will result in a variable amount of lost motion between cam plate 32 and carrier 37, the purpose of which lost motion will be hereinafter described.

A mercury switch clip 46 is secured to the upper portion of carrier 37 and holds a mercury switch 47. A mercury switch carrying plate 48 is pivotally mounted upon carrier 37 and may be adjusted thereon by means of screw 49 which passes through an elongated slot 50 formed in plate 48 and enters the carrier 37. A pointer 51 formed on plate 48 cooperates with indicia 52 formed on carrier 37. The plate 48 carries a mercury switch clip 53 which supports a mercury switch 54. The mercury switch 54 in this particular instance is shown as a double-ended mercury switch adapted to make one circuit and break another upon tilting in either direction.

A crank pin 55 which is secured to cam plate 32 at a point remote from its mounting on shaft 30 actuates an indicating lever 56 which has a pointer 57 that slides in a slot 58 formed in the lower portion of adjusting handle 22 and cooperates with indicia 59 graduated in the lower portion of adjusting handle 22. The adjusting handle 22 is further formed with an opening that provides a pointer 60 which cooperates with indicia 61 carried by a scale plate 62 which in turn is secured to base plate 11 by screws 63.

Figure 4:
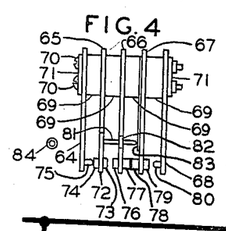
Fig. 4 is a side view of the reversing switching mechanism in its winter position, as shown in Fig. 1.
Figure 4A:
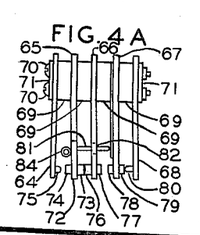
Fig. 4A is a view similar to Fig. 4 but with the reversing switching mechanism shown in its summer position.
Figure 5:
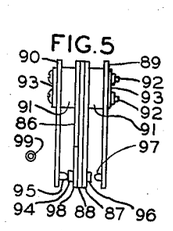
Fig. 5 is a view of the over-run contacting mechanism in its cold position as shown in Fig. 1.
Figure 5A:
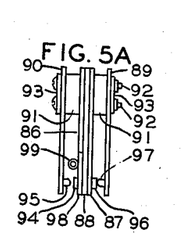
Fig. 5A is a similar view of the over-run contacting mechanism but in its hot position.

The summer reversing switching mechanism (shown in more detail in Figs. 4 and 4A) comprises a switching assembly composed of flexible switch arms 64, 65, 66, 67 and 68 which are spaced one from another by blocks of insulating material 69 and are held together by means of screw and nuts 70, there being a piece of insulating material 71 between the heads of the screws and the cooperating nuts and the adjacent flexible switch arms. Switch arm 65 is provided with a lateral extension 72 and in addition carries two contacts 73 and 74, the latter of which cooperates with a contact 75 carried by flexible switch arm 64. Contact 73 cooperates with a contact 76 carried by switch arm 66 and a second contact 77 carried thereby cooperates with contact 78 carried by switch arm 67. A second contact 79 carried by switch arm 67 cooperates with a contact 80 carried by switch arm 68. A pin 81 which is secured to switch arm 65 extends through an aperture 82 in switch arm 66 and engages a piece of insulating material 83 which lies against switch arm 67. The summer-winter switching mechanism normally assumes the position shown in Fig. 4 (this is the winter position) wherein contact 74 is in engagement with contact 75 and contact 77 is in engagement with contact 78. The lateral extension 72 is adapted to be engaged by an insulating sleeve 84 which is carried by an extension 85 that is integral with or secured to adjusting handle 22. Upon proper manipulation of adjusting handle 22, insulating sleeve 84 is brought into engagement with lateral extension 72 as shown in Fig. 4A whereupon contact 74 is moved out of engagement with contact 75 and contact 73 is moved into engagement with contact 76. The pin 81 engages insulating material 83 and thereby moves switch arm 67 in such manner that its contact 78 disengages contact 77 and its contact 79 moves into engagement with contact 80. This is the summer position of the switching mechanism of Fig. 4. It will be noted that this switching mechanism amounts to a double pole, double throw reversing switch and it will be readily appreciated and should be understood that a larger or smaller number of switches can be utilized depending upon the particular circuits which it is desired to control. The over-run switching mechanism shown in Figs. 5 and 5A comprises two switch arms 86 and 87 between which is interposed a piece of insulating material 88. Switch arms 89 and 90 are spaced from switch arms 87 and 86 by blocks of insulating material 91 and the assembly is held together by means of screw and nut assemblies 92, there being a piece of insulating material 93 placed between the heads of screws and between the nuts and the adjacent switch arms 89 and 90. Switch arm 86 carries a contact 94 which cooperates with a contact 95 carried by switch arm 90. In similar manner switch arm 87 carries contact 96 which cooperates with the contact 97 carried by switch arm 89. The switch arm 86 is provided with a lateral extension 98 which is adapted to be engaged by an insulating sleeve 99 carried by cam plate 32. In Fig. 5, the over-run contacts are shown in their normal position in which contact 94 is in engagement with contact 95 and contacts 96 and 97 are disengaged. Upon engagement of lateral extension 98 by insulating sleeve 99, contact 94 will be moved out of engagement with contact 95 and contact 96 will be moved into engagement with contact 97.

As heretofore explained, the torsion rod 30 is rotated by bi-metallic helix 28 in conformity with changes in the temperature to which bi-metallic helix 28 is subjected. With the parts in the position shown, the complete switching mechanism is set for winter operation with the pointer 60 indicating that the apparatus is so arranged that mercury switch 47 will be moved to closed position when a temperature of approximately 175° is reached and with the pointer 51 set in an intermediate position indicating that the mercury switch 54 will be tilted to its hot position upon a medium rise in temperature above the 175° setting of the pointer 60. The temperature indicating pointer 57 indicates that the temperature to which bi-metallic helix 28 responds is below 100°. Now if the temperature to which bi-metallic helix 28 responds begins to rise, cam plate 32 will be rotated in a counter-clockwise direction as viewed in Figs. 1 and 3. Crank 55 will thereupon raise lever 56 and temperature indicating pointer 57 to indicate the rise in temperature and at the same time the screw 42 and carrier 37 will remain stationary by reason of the irregular opening 43 until the lost motion between the cam plate 32 and the screw 42 is taken up. If the temperature continues to rise, the edge of cam plate 32 which defines the left hand edge of opening 43 will engage screw 42 and turn carrier 37 in a counter-clockwise direction as viewed in Fig. 1. When temperature indicating pointer 57 indicates a temperature of about 175°, the carrier 37 will have been rotated to such a position that the circuit through mercury switch 47 will be closed. Upon a medium further rise in temperature, say about 25 degrees Fahrenheit, the mercury switch 54 will be moved to a position in which its cold contacts will be opened and its hot contacts will be closed. If the temperature rise should become excessive, resulting in excessive rotation of cam plate 32, the insulating sleeve 99 carried by cam plate 32 will engage the lateral extension 98 of switch arm 86 with result that contact 94 will be disengaged from contact 95 and contact 96 will be moved into engagement with contact 97.

Upon a temperature fall, the insulating sleeve 99 which is carried by cam plate 32 will first disengage lateral extension 98 (if the temperature has formerly risen to such a degree as to cause engagement of sleeve 99 with extension 98) and screw 42 will immediately disengage the left hand edge formed by the opening 43 in cam plate 32. Upon continued temperature fall, the lost motion between screw 42 and the opening 43 will be taken up and the screw 42 will be engaged by the right hand edge formed in cam plate 32 by the opening 43 whereupon carrier 37 will begin to rotate in a clockwise direction as viewed in Fig. 1. Mercury switch 54 will first be moved to the position shown in Fig. 1 and thereafter mercury switch 47 will be moved to its open position as shown in Fig. 1. The temperature at which mercury switch 47 is moved to its open position as shown in Fig. 1 will be somewhat lower than the 175° at which pointer 60 is set and the amount of this deviation from 175° will depend upon the amount of lost motion between screw 42 and cam plate 32 as determined by the position of screw 42 in slot 41. The irregular shape of opening 42 is provided in order that the change in differential between the opening and closing movements of mercury switch 47 will remain substantially constant for equal vertical adjustments of screw 42 in slot 41.

It is necessary that the pointer 57 cooperate with indicia carried by the adjusting handle 22 or some other part moved in accordance with the movements of adjusting handle 22 because this adjusting handle varies the position of the relatively stationary end of bi-metallic helix 28. By the arrangement shown, the adjusting handle 22 not only changes the basic temperature setting of the device but by reason of its cooperation with the pointer 57 which is moved by the relatively free end of a bi-metallic helix 28 an accurate temperature indication can be obtained irrespective of the position or setting of the adjusting handle 22. The indicia A, B, C, D indicated at 45 which cooperate with the pointer 44 indicate the amount of lost motion between screw 42 and the cam plate 32 which in turn is an indication of the differential at which mercury switches 47 and 54 will be operated. The pointer 51 and cooperating indicia 52 make it possible to obtain an approximation of the setting of mercury switch 54 in respect to the setting of mercury switch 47.

When it is desired to operate the reversing switching mechanism, as during the summer time, the adjusting handle 22 is moved to its extreme right hand position as viewed in Fig. 1 with the result that insulating sleeve 84 is brought into engagement with lateral extension 72 as previously explained so as to operate the reversing switching mechanism.

From the foregoing description, it will be seen that this invention provides a novel manner of operating an auxiliary switching mechanism, such as a reversing switching mechanism, whenever the adjusting means of the device is moved to a predetermined position. The invention also provides an apparatus in which the temperature can be indicated, irrespective of the setting of the instrument, even though the changes in the setting of the instrument are obtained by repositioning the relatively stationary end of the actuator. In addition, the apparatus likewise provides many other specific improvements in the arrangement and cooperation of the various parts.

The base plate 11 may, if desired, support an electromagnetic relay generally indicated at 100 and in a similar manner the panel 12 may carry a transformer generally indicated at 101.

Figure 6:
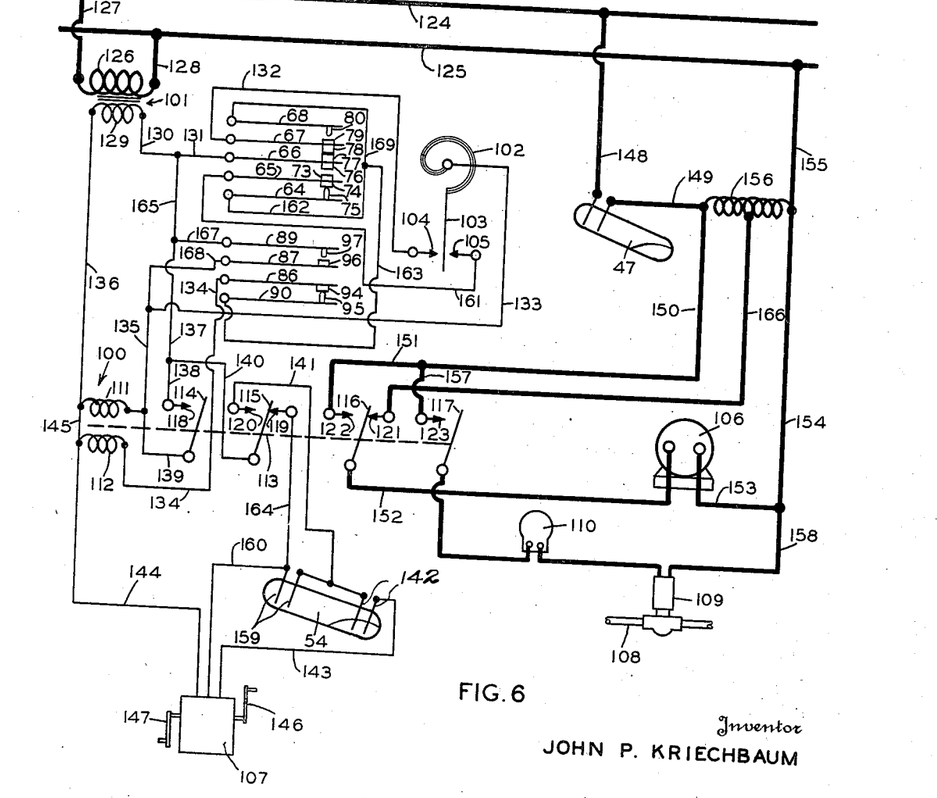
Fig. 6 is a schematic wiring diagram showing one of the many manners in which the switching mechanism of the other figures may be utilized in a control system.
Figure 7:
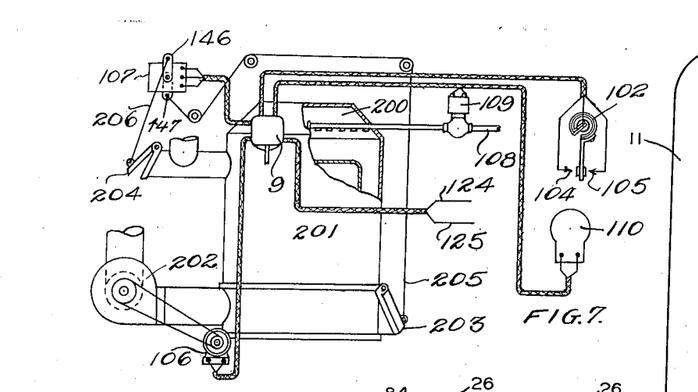
Fig. 7 is a diagrammatic showing of the control system of the present invention applied to a warm air furnace.

Turning now to Figs. 6 and 7, one of the manners in which the present invention may be utilized is shown. A main control is herein shown in the form of a bi-metallic actuator 102 which upon temperature fall moves a blade 103 into engagement with a contact 104 and upon temperature rise moves the blade 103 into engagement with a contact 105. In the present embodiment of the invention, this main control is subjected to the temperature of the room or space to be heated. The bi-metallic helix 28 responds to the temperature of the fluid medium by which the room or space is heated and in the present embodiment it is assumed that the bi-metallic helix 28 is placed in the bonnet 200 of a warm air furnace 201. The mercury switch 47 helps to control a heating medium circulating means herein indicated as a motor 106 which is utilized to control an air circulating fan 202. A damper motor, of well-known construction, is indicated at 107 and operates in the usual manner to increase and decrease the supply of heat to the fluid medium circulated by the motor 106 by operating draft and check dampers 203 and 204 and the mercury switch 54 operates as a high limit switch for the damper motor 107 as will be hereinafter brought out. A water supply pipe for humidifying purposes is indicated at 108 and is controlled by a valve 109 which, among other things, is controlled by a humidity control 110. The relay 100 comprises two coils, one of which indicated at 111 is an energizing or pull coil and the other of which indicated at 112 is a de-energizing or bucking coil. The energizing and pull coils 111 control an armature 113 which in turn operates switch arms 114, 115, 116 and 117.

The armature and switch arms normally assume the position shown and upon energization of energizing coil 111 switch arm 114 moves into engagement with a contact 118, switch arm 115 disengages a contact 119 and engages a contact 120, switch arm 116 disengages a contact 121 and engages a contact 122, and switch arm 117 moves into engagement with the contact 123. High voltage electrical current is supplied by line wires 124 and 125 and low voltage current is supplied by the transformer 101 which is provided with a high voltage primary 126 that is connected to line wires 124 and 125 by wires 127 and 128 and is further provided with a low voltage secondary 129. The remaining circuit connections will be referred to under the headings "Operation."

Winter operation of the system of Fig. 6

With the parts in the position shown, the room temperature is between its high and low desired limits, the damper motor 107 is in such position that the supply of heat furnished by the furnace is being decreased, the water valve 109 is closed irrespective of the relative humidity in the room, fan motor 106 is inactive and the bonnet temperature of the furnace is below the setting of the switching mechanism. The room temperature therefore will begin to fall and when blade 103 engages contact 104 an energizing circuit for energizing coil 111 will be established as follows: from one side of secondary 129, wire 130, wire 131, switch arm 66, contacts 77 and 78, switch arm 67, wire 132, contact 104, blade 103, wire 133, wire 135, energizing coil 111 and wire 136 to the other side of secondary 129. Energization of energizing coil 111 attracts armature 113 to operate the switch arms 114, 115, 116 and 117 as heretofore described. Engagement of switch arm 114 with contact 118 establishes a holding circuit for energizing coil 111 which is independent of all other switches including the switch comprised by contact 104 and blade 103 and this holding circuit is as follows: secondary 129, wire 130, wire 165, wire 137, wire 138, contact 118, switch arm 114, wire 139, energizing coil 111 and wire 136 to the other side of secondary 129. Engagement of switch arm 115 with contact 120 establishes an energizing circuit for damper 107 as follows: secondary 129, wire 130, wire 165, wire 137, wire 140, switch arm 115, contact 120, wire 141, cold contacts 142 of limit switch 54, wire 143, damper motor 107, wire 144, wire 145 and wire 136 to the other side of secondary 129. Energization of damper motor 107 causes its crank arms 146 and 147 to be moved through a half revolution to open the damper 203 and close the check 204 through the medium of chains or cables 205 and 206 in the usual manner to increase the heat output from the furnace 201. The temperature of the air in the bonnet 200 of the furnace 201 will therefore be increased and when it has been increased sufficiently the fan switch 47 will be moved to closed circuit position as hereinbefore described resulting in operation of the fan motor 106 at high speed by a circuit which is as follows: line 124, wire 148, fan switch 47, wire 149, wire 150, wire 151, contact 122, switch arm 116, wire 152, fan motor 106, wire 153, wire 154 and wire 155 to line 125. It will be noted that all of the turns of an auto-transformer 156 are in parallel with fan motor 106 under these conditions. The fan 202 operating at high speed will deliver the heated air to the room and if this delivery of air should, by any chance, cause a sufficient lowering in the bonnet temperature to move fan switch 47 to open position, the fan motor 106 will again be de-energized.

At any time while fan switch 47 is closed, if the humidity control 110 should close its circuit indicating that the relative humidity of the space or room is below the desired point, the water valve 109 will be energized by a circuit which is as follows: line 124, wire 148, fan switch 47, wire 149, wire 150, wire 157, contact 123, switch arm 117, humidity control 110, water valve 109, wire 158, wire 154, and wire 155 to line 125. It will be noted that the humidity control may operate to open water valve 109 at any time that the relative humidity in the room is below the desired point provided the fan switch 47 is closed and provided further that the fan is operating at high speed by reason of armature 113 being in such position that switch arms 116 and 117 are in engagement with their respective contacts 122 and 123.

If the bonnet temperature should become excessive while the fan 202 is operating and the draft damper 203 open, limit switch 54 will be moved to a position to open the circuit through cold contacts 142 and to close the circuit through hot contacts 159 whereby an energizing circuit for damper motor 107 is established as follows: secondary 129, wire 130, wire 165, wire 137, wire 140, switch arm 115, contact 120, wire 141, hot contacts 159, wire 160, damper motor 107, wire 144, wire 145 and wire 136 to the other side of secondary 129. The crank arms 146 and 147 are thereupon moved to the position shown in Fig. 6 and the supply of heat to the furnace 201 is decreased until such time as the bonnet temperature drops sufficiently to return limit switch 54 to the position shown in Fig. 6. At this time, assuming the room thermostat is still calling for heat, the previously described circuit for damper motor 107 will be re-established and the crank arms 146 and 147 will be moved to a position to increase the supply of heat to the furnace.

The room temperature will finally rise to such a point that blade 103 will be moved into engagement with contact 105 whereupon bucking coil 112 will be energized by a circuit as follows: secondary 129, wire 130, wire 165, wire 137, wire 138, contact 118, switch arm 114, wire 139, wire 135, wire 133, blade 103, contact 105, wire 161, switch arm 65, contacts 74 and 75, switch arm 64, wire 162, wire 163, switch arm 90, contacts 95 and 94, switch arm 86, wire 134, bucking coil 112, wire 145 and wire 136 to the other side of secondary 129. Energization of bucking coil 112 will neutralize the magnetic effect of energizing coil 111 whereupon armature 113 and the associated switch arms will move to the position shown in Fig. 6. Immediately upon disengagement of switch arm 114 from contact 118 both the previously described holding circuit for energizing coil 111 and the circuit for bucking coil 112 will be broken whereupon armature 113 will remain in the position shown in Fig. 6. Engagement of switch arm 115 with contact 119 will energize damper motor 107 to decrease the fire in the furnace, if it has not already been so moved by the limit switch 54, by a circuit which is as follows: secondary 129, wire 130, wire 165, wire 137, wire 140, switch arm 115, contact 119, wire 164, wire 160, damper motor 107, wire 144, wire 145, and wire 136 to the other side of secondary 129. Disengagement of switch arm 117 from contact 123 will prevent energization of water-valve 109 irrespective of the relative humidity to which humidity control 110 responds. Engagement of switch arm 116 with contact 121 will operate fan motor 106 at half speed provided fan switch 47 is still closed. This is by virtue of a circuit from line 124 to wire 148, fan switch 47, wire 149, auto-transformer 156 and wire 155 to line 125 together with the circuit from the center of auto-transformer 156 through a wire 166 to contact 121, switch arm 116, wire 152, fan motor 106, wire 153 and wire 154 to one end of auto-transformer 156. When the bonnet temperature falls sufficiently to open fan switch 47, the fan motor 106 will be completely de-energized.

It sometimes happens that if the bonnet temperature is relatively high at the time the room thermostat becomes satisfied and the fan motor 106 is reduced in speed, the bonnet temperature may continue to rise until it becomes dangerous even though the dampers of the furnace have been operated to reduce the fire. In such a case, insulating sleeve 55 carried by cam plate 32 will engage extension 98 to separate contacts 94 and 95 and to close contacts 96 and 97 as hereinbefore described in connection with the operation of the switching mechanism of Figs. 1 to 5A inclusive. When this happens, a circuit to energizing coil 111 is established as follows: secondary 129, wire 130, wire 165, wire 167, switch arm 89, contacts 97 and 96, switch arm 87, wire 168, wire 135, energizing coil 111 and wire 136 to the other side of secondary 129. Energization of energizing coil 111 attracts armature 113 as above described, and establishes a holding circuit for energizing coil 111 through contact 118 and switch arm 114 as formerly pointed out, and likewise operates fan motor 106 at high speed as previously explained, it being remembered that fan switch 47 is closed. It will also be remembered that high limit switch 54 is in its hot position if the temperature is sufficiently high to operate the over-run switching mechanism so the damper motor 107 will not be operated to increase the supply of heat to the furnace. Fan motor 106 will therefore continue operating until such time as the bonnet temperature is reduced sufficiently to return the over-run contact mechanism to the position shown in Fig. 5 at which time the bucking coil 112 will be energized by the same circuit previously described provided blade 103 is still in engagement with contact 105, indicating that the room temperature is sufficiently high.

*Summer operation of the system of Fig. 6*

In the summer time, adjusting handle 22 is moved to its extreme right hand position as shown in Fig. 1 whereupon the reversing switching mechanism is moved to the position shown in Fig. 4A and the setting of the fan switch 47 is made so low that the fan switch 47 will never open under normal temperature changes in the bonnet during the summer time. Likewise limit switch 54 will remain in its hot position throughout the summer time under normal temperature changes. Movement of reversing switching mechanism to the position shown in Fig. 4A operates to reverse the room thermostat contacts 104 and 105 in such manner that energizing coil 111 will be energized when the room becomes hot and blade 103 engages contact 105 and the bucking coil 112 will be energized when the room is cold and the blade 103 engages contact 104. In the summer operation, it may be desirable to manually disconnect the water supply through pipe 108 either by a manual valve or by opening the circuit to the water valve 109 or by lowering the setting of the humidostat 110 in order to prevent the spraying of water into the stream of cold circulating air at the command of the humidity control 110. Inasmuch as fan switch 47 will always be closed during summer operation, fan motor 106 will always operate at least at low speed and will never be shut down.

If the room temperature should become excessive, contact 103 will engage contact 105 to energize energizing coil 111 by a circuit as follows: secondary 129, wire 130, wire 131, switch arm 66, contacts 76 and 73, switch arm 65, wire 161, contact 105, blade 103, wire 133, energizing coil 111 and wire 136 to secondary 129. Energization of energizing coil 111 will move switch arm 114 into engagement with contact 118 to establish the hereinbefore described holding circuit for energizing coil 111 which is independent of all other switches. Switch arm 115 will move into engagement with contact 120 to attempt to increase the fire in the furnace 201 but since limit switch 54 has been moved to its hot position by the previous manual manipulation of adjusting handle 22, the engagement of switch arm 115 with contact 120 will not result in increasing the heat output of the furnace. Switch arm 116 will be moved into engagement with contact 122 to operate fan motor 106 at high speed to increase the circulation of air through the rooms in an attempt to reduce the room temperature. In this connection, it will be appreciated cooling means could be utilized in connection with this high speed operation of the fan motor 106 in order to cool the room or space to be heated. Whenever the room temperature lowers sufficiently to cause blade 103 to engage contact 104, an energizing circuit for bucking coil 112 will be established as follows: secondary 129, wire 130, wire 165, wire 137, wire 138, contact 118, switch arm 114, wire 139, wire 135, wire 133, blade 103, contact 104, wire 132, switch arm 67, contacts 79 and 80, switch arm 68, wire 169, wire 163, switch arm 90, contacts 95 and 94, switch arm 86, wire 134, bucking coil 112, wiring 145 and wire 136 to secondary 129. The armature 113 and associated switch arms will thereupon be moved to the position shown in Fig. 6 and fan motor 106 will again be operated at low speed.

If the bonnet temperature during the summer operation is increased above a certain point, contacts 96 and 97 will be moved into engagement and contacts 94 and 95 will be moved out of engagement, as previously described. Since the setting of the bonnet temperature responsive switching mechanism has been changed by actuation of the adjusting handle 22, this closure of contacts 96 and 97 and opening of contacts 94 and 95 will occur at a lower temperature than during normal winter operation. As soon as this operation of these contacts occurs, the relay coil 111 will be energized by the same circuit as traced in connection with the overrun condition during winter operation. The energization of relay 111 will cause operation of the fan at high speed since the fan switch 47 is maintained permanently closed during the summer. Provision is thus made for guarding against the dangerous conditions which might be produced if trash were thrown into the furnace during the summer without any provision for operating the fan to carry off the heat produced in the furnace.

From the foregoing description, it will readily be seen that this invention provides not only the novel switching mechanism hereinbefore described in detail but also provides a novel control system wherein in the winter time a circulating means is prevented from operating whenever the temperature of the circulating medium is too low, is operated at an intermediate speed whenever the temperature of the fluid medium is at or above a desired point and the space to be heated is at or above its desired temperature, operates at high speed when the fluid medium temperature is sufficiently high but the room temperature is below the point desired, and operates at high speed when the room temperature is at or above that desired but the temperature of the fluid medium is excessive. In addition, during winter time the invention provides a system wherein water for humidifying purposes is furnished only at such times as the relative humidity is below the desired point and the circulating means is operating at high speed.

In the summer time, the system of this invention provides for continuous operation of the circulating means at low speed when the room is cool and operates the circulating means at high speed when the room is too warm.

If desired, the two speed operation of the fan motor 106 may be eliminated by removing wire 166 and by omitting auto-transformer 156. If this is done, then in the summer, the fan motor 106 will only be operated when the space or room temperature becomes excessive and will remain inoperative at all other times during the summer and in the winter the fan motor 106 will not be operated at half speed when the room temperature is sufficiently high and the bonnet temperature is such that fan switch 47 is closed.

It will be readily appreciated that the system of the present invention has general utility and particularly in that it may be used with many different types of heat increasing apparatus instead of the damper motor specifically disclosed. I intend, therefore, to be limited only by the scope of the appended claims.

I claim as my invention:

1. In combination, heating mechanism for heating a space and including circulating means, control means associated with the heating mechanism and circulating means, manually adjustable means associated with said control means for varying the operation of the heating mechanism and circulating means during the winter, switching mechanism moved to a new circuit controlling position upon extreme movement of said manually adjustable means, and connections between said switching mechanism and heating mechanism whereby upon such operation of said switching mechanism the operation of said circulating means is varied.

2. In combination, a space the temperature of which it is desired to control, means for circulating air through said space, control means for said circulating means, manually adjustable means associated with said control means for varying the operation of said circulating means, and mechanism operated by said manually adjustable means for altering the control of said control means on said circulating means.

3. In combination, a space the temperature of which it is desired to control, means for circulating air through said space, a space temperature responsive thermostat in control of said circulating means, control means for additionally controlling said circulating means, manually operable adjusting means for adjusting said control means, and reversing switching mechanism associated with said space thermostat and control means and operated to a new position by said manually operable adjusting means when the latter is moved to one of its extreme positions.

4. A summer-winter control system of the class described, comprising, in combination, a heat increasing means for heating a fluid medium to be circulated to a space to be heated, a circulator for circulating said fluid medium, a space thermostat for operating the heat increasing means and circulator upon fall in space temperature in the winter, a first thermostatically controlled device for preventing operation of said circulator by the space thermostat when the temperature of the fluid medium is below a predetermined value, a second thermostatically controlled device for preventing operation of the heat increasing means by the space thermostat to increase the temperature of the fluid medium when the temperature thereof is above a predetermined maximum, reversing mechanism for changing the arrangement of the parts in such manner as to cause operation of the circulator in the summer when the space temperature becomes too high, and adjusting means for changing the setting of said thermostatically controlled devices, the parts being so arranged that extreme motion of said adjusting means operates said reversing mechanism to condition the system for summer operation, sets the second mentioned thermostatically controlled device in its hot position so that the heat increasing means cannot be operated by the space thermostat and sets the first mentioned thermostatically controlled device in such position that the circulator may always be operated by the space thermostat irrespective of normal fluctuations in the temperature of the fluid medium.

5. A summer-winter control system of the class described, comprising, in combination, an electrical heat increasing means for heating air which it is desired to circulate to a space to be heated, an electrically operated fan for circulating said air, a space thermostat switching means for operating the heat increasing means and fan upon lowering in the space temperature in the winter, a thermostatically controlled fan switch for preventing operation of said fan by the space thermostat switching means when the temperature of the air is below a predetermined value, a thermostatically controlled high limit switch for preventing operation of the heat increasing means by the space thermostat switching means to increase the temperature of the air when the temperature thereof is above a predetermined maximum, reversing switching mechanism for changing the circuit connections in such manner as to cause operation of the fan in the summer when the space temperature is too high, and adjusting means for changing the setting of said fan and high limit switches, the parts being so arranged that extreme motion of said adjusting means operates said reversing switching mechanism to condition the system for summer operation, sets the high limit switch in its hot position so that the heat increasing means cannot be operated by the space thermostat switching means and sets the fan switch in such position that it will always remain closed upon normal fluctuations in the temperature of the circulated air.

6. A temperature control system of the class described, comprising, in combination, an electrically operated circulation controlling means for controlling the circulation of a fluid medium, a thermostat, reversing switching mechanism, connections between said thermostat, reversing switching mechanism and circulation controlling means by which said thermostat operates said circulation controlling means upon a fall in temperature when the reversing switching mechanism is in one position and upon a rise in temperature when the reversing switching mechanism is in its other position, a thermostatic switch responsive to the temperature of the fluid medium for additionally controlling the operation of said circulation controlling means, adjusting means for said thermostatic switch, and connections between said adjusting means and reversing switching mechanism by which operation of said adjusting means to a predetermined position causes operation of said reversing switching mechanism to a new position.

7. In a temperature control system, a double circuit thermostatic switching mechanism, a relay including a load switching mechanism, a reversing switching mechanism, connections between said thermostatic switching mechanism, relay and reversing switching mechanism by which the control of said relay by said thermostatic switching mechanism is reversed upon operation of said reversing switching mechanism to a new circuit controlling position, electrically operated circulation controlling means for circulating a fluid medium, a switch responsive to the temperature of said fluid medium, circuit connections for the circulation controlling means including said load switching mechanism and said fluid medium temperature responsive switch, adjusting means for said fluid medium temperature responsive switch, and connections between said adjusting means and reversing switching mechanism by which a predetermined movement of said adjusting means causes movement of said reversing switching mechanism to said new circuit controlling position.

8. In a temperature control system, in combination, a room thermostat adapted to complete hot and cold circuits upon rise and fall in room temperature above and below a desired value, double coil relay mechanism controlled by said circuits, reversing switching mechanism, circuit connections associated with said relay mechanism, room thermostat and reversing switching mechanism by which operation of said reversing switching mechanism reverses the control of said relay mechanism by the room thermostat, a circulator for circulating a fluid medium, a circulator switch responsive to the temperature of the fluid medium and closed when the temperature thereof is sufficiently high, a relay mechanism operated switch, a circuit for the circulator controlled by the circulator switch and relay mechanism operated switch in series, adjusting means for changing the temperature of the fluid medium at which said circulator switch closes, and connections between said adjusting means and reversing switching mechanism for operating the latter when the setting of the circulator switch is lowered to a predetermined point.

9. In a heating system, in combination, a main controlling thermostatic switching mechanism, a heater for heating a fluid medium, electrical circulation controlling means in control of the circulation of said fluid medium, electrical means for controlling said heater, a high limit switch responsive to a condition directly produced by said heater, reversing switching mechanism, electrical connections by which said main controlling switching mechanism operates said heater controlling means through said high limit switch and said circulating means independently of the high limit switch upon temperature fall when the reversing switching mechanism is in one position and upon temperature rise when said reversing switching mechanism is in its other position, means for adjusting said high limit switch to respond to a value of said condition which will normally prevent operation of said heater controlling means, and means associated with said adjusting means and reversing switching mechanism for operating the latter to the position in which said main controlling thermostat operates said circulation controlling means upon rise in temperature when said adjusting means is so operated.

10. In a warm air heating system, the combination with a warm air furnace and an electrically operated circulator for circulating the air heated thereby, of electrical means in control of said heater, a high limit switch responsive to a condition produced directly by said heater, a room thermostat, means including electrical connections associated with said thermostat, circulator, heater controlling means and high limit switch by which said heater controlling means is operated through said high limit switch and said circulator is operated independently thereof when the room temperature falls to a predetermined minimum, reversing switching mechanism associated with said connections for reversing the action of said thermostat on said heater controlling means and circulator when said reversing switching means is moved to a new position, means for adjusting said high limit switch to such a low value as to prevent operation of said heater controlling means by said thermostat, and means associated with said reversing switching mechanism and adjusting means for moving the former to said new position when the high limit switch is adjusted to said low value.

11. The combination with a warm air furnace, an electrically operated circulator for circulating the air heated thereby and electrical means in control of said heater, of a two position relay in control of said heater controlling means and circulator, a room thermostat, a summer-winter reversing switching means, circuit connections between said relay, room thermostat and summer-winter reversing switching means by which said relay is selectively moved to one of its positions upon a fall or rise in room temperature when the reversing switching means is in winter or summer position respectively, switching means controlled by said relay when moved to said one of its positions for operating said heater controlling means to produce more heat and for energizing said circulator, a condition responsive high limit switch in circuit with said heater controlling means to prevent operation thereof when the value of said condition is above the setting of the high limit switch, and adjusting means associated with said high limit switch and summer-winter reversing switching means for simultaneously adjusting the setting of said high limit switch to a relatively low value and moving said summer-winter switching means to its summer position.

12. The combination with a warm air furnace, an electrically operated circulator for circulating the air heated thereby and electrical means in control of said heater, of a two position relay in control of said heater controlling means and circulator, a room thermostat, a summer-winter reversing switching means, circuit connections between said relay, room thermostat and summer-winter reversing switching means by which said relay is selectively moved to one of its positions upon a fall or rise in room temperature when the reversing switching means is in winter or summer position respectively, switching means controlled by said relay when moved to said one of its positions for operating said heater controlling means to produce more heat and for energizing said circulator, a thermal actuator responsive to the temperature of the circulated air, a circulator switch controlled thereby and moved to closed position when the temperature of the heated air is sufficiently high to permit operation of said circulator, a high limit switch controlled by said actuator and moved to a new circuit controlling position when the temperature of the heated air becomes too high whereby to prevent operation of said heater controlling means, and manually operable means for simultaneously lowering the settings of said circulator switch and high limit switch so that said circulator switch is always closed and said high limit switch is always in said new circuit controlling position, said means being operative also to move said summer-winter switching means to its summer position when said circulator and high limit switches are so adjusted.

13. In a temperature control system, an electrically operated circulator for circulating a fluid medium, a switch responsive to the temperature of the fluid medium, circuit connections controlled by said switch for operating said circulator at one speed when said switch is closed, a thermostatic switch responsive to a temperature condition other than that of the fluid medium, circuit connections for operating said circulator at another speed when both said switches are closed, a third switch responsive to a different temperature value of said fluid medium, and circuit connections for operating said circulator at one of said speeds when said third switch is closed irrespective of the condition of said thermostatic switch.

14. The combination with a warm air furnace and an electrically actuated circulator for circulating the air heated thereby, of means in control of the supply of heat to said air, a switch responsive to the temperature of said air and closed when the temperature thereof is above a predetermined minimum value, a circuit for operating said circulator at low speed controlled by said switch, a room thermostat, connections between said room thermostat, heat supply controlling means and circulator for increasing the supply of heat to said air and for operating said circulator at a higher speed when the room temperature falls below a predetermined value, a second switch responsive to a condition directly produced by said furnace, and circuit connections controlled by said switch for operating said circulator at said higher speed irrespective of the room temperature.

15. The combination with apparatus for changing the condition of air to be delivered to a space, of means for changing a condition of such air, circulation controlling means for controlling the circulation of air to said space, control means responsive to space conditions arranged to operate said circulation controlling means upon fall or rise in space temperature to increase or decrease the flow of air to the space and to operate said condition changing means, means responsive to a condition of said air associated with said condition changing means to prevent operation thereof when said condition of the air is at a certain value while permitting continued operation of said circulation control means, reversing means to reverse the control of said circulation controlling means by said space conditions responsive control means, and a single means operable simultaneously to operate said reversing means and to operate said air condition responsive means to prevent operation of the condition changing means by said space condition responsive control means.

16. In combination, circulation controlling means in control of the circulation of air to a space, a control means associated with said circulation controlling means to operate the same to selectively increase or decrease the flow of air to said space, other control means associated with said circulation controlling means for additionally controlling the same, means to reverse the control action of one of said control means on said circulation controlling means, means to adjust one of said control means, and a single means to operate said adjusting means and reversing means.

17. In combination, circulation controlling means in control of the flow of air to a space, space temperature responsive control means, air temperature responsive control means, connections by which both of said control means cooperate in the control of said circulation controlling means, adjusting means for adjusting the response of one of said control means, reversing means associated with said connections to reverse the control action of one of said control means on said circulation controlling means, and a single device to operate said reversing means and adjusting means.

18. In a temperature control system for a space, a heater for heating a fluid medium, an electrically operated circulator for circulating said fluid medium into heat exchanging relation with said space, a changeover switch movable from a first normal to a second position, a space temperature responsive thermostat, switching means responsive to the temperature of the heater, means including said thermostat, said heater responsive switching means and said changeover switch operative when said changeover switch is in said first position and said space temperature falls below a predetermined value to cause said heater to continuously increase the supply of heat to the fluid medium unless said heater temperature rises above a predetermined abnormally high first value and to cause operation of said circulator at a predetermined speed after said heater temperature is above a predetermined second value lower than said first value, further means including said thermostat and said changeover switch operative when said changeover switch is in said second position and said space temperature rises above a predetermined temperature to cause operation of said circulator but not of said heater, and further means including said switching means responsive to heater temperature for operating said circulator at said predetermined speed when said changeover switch is in said second position upon said heater temperature attaining a predetermined third value.

JOHN P. KRIECHBAUM.